(12) United States Patent
Murr et al.

(10) Patent No.: US 6,872,094 B1
(45) Date of Patent: Mar. 29, 2005

(54) TRANSCEIVER PLUGGABLE MODULE

(75) Inventors: Keith McQuilkin Murr, Etters, PA (US); Michael Warren Fogg, Harrisburg, PA (US); Michael Eugene Shirk, Grantville, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/790,467

(22) Filed: Mar. 1, 2004

(51) Int. Cl.[7] .......................................... H01R 13/648
(52) U.S. Cl. ..................... 439/607; 439/76.1
(58) Field of Search .............................. 439/607, 76.1, 439/676

(56) References Cited

U.S. PATENT DOCUMENTS

| | | | | |
|---|---|---|---|---|
| 6,430,053 B1 | * | 8/2002 | Peterson et al. ............. | 361/728 |
| 6,434,015 B1 | * | 8/2002 | Hwang ........................ | 361/754 |
| 6,439,918 B1 | * | 8/2002 | Togami et al. ............... | 439/372 |
| 6,443,768 B1 | * | 9/2002 | Dirkers et al. ............... | 439/607 |
| 6,478,622 B1 | * | 11/2002 | Hwang ........................ | 439/607 |
| 6,485,322 B1 | * | 11/2002 | Branch et al. ............... | 439/357 |
| 6,494,623 B1 | * | 12/2002 | Ahrens et al. ................ | 385/76 |
| 6,499,890 B2 | * | 12/2002 | Gilliland et al. .............. | 385/88 |
| 6,508,670 B1 | * | 1/2003 | Hwang ........................ | 439/607 |
| 6,517,382 B2 | * | 2/2003 | Flickinger et al. .......... | 439/607 |
| 6,524,134 B2 | * | 2/2003 | Flickinger et al. .......... | 439/607 |
| 6,530,785 B1 | * | 3/2003 | Hwang ........................ | 439/76.1 |
| 6,532,155 B2 | * | 3/2003 | Green et al. ................. | 361/733 |
| 6,533,603 B1 | * | 3/2003 | Togami ....................... | 439/372 |
| 6,558,191 B2 | * | 5/2003 | Bright et al. ............. | 439/541.5 |
| 6,570,768 B2 | * | 5/2003 | Medina ....................... | 361/747 |
| 6,575,770 B2 | * | 6/2003 | Birch et al. ................. | 439/76.1 |
| 6,609,838 B1 | * | 8/2003 | Branch et al. ................ | 385/92 |
| 6,612,868 B2 | * | 9/2003 | Hwang ........................ | 439/607 |
| 6,619,999 B2 | * | 9/2003 | Bright ........................ | 439/751 |
| 6,648,693 B1 | * | 11/2003 | Hogan et al. ................ | 439/630 |
| 6,655,995 B1 | * | 12/2003 | Reisinger et al. ........... | 439/607 |
| 6,666,694 B1 | * | 12/2003 | Daly et al. .................... | 439/79 |
| 6,666,720 B1 | * | 12/2003 | Reisinger et al. ........... | 439/607 |
| 6,672,901 B2 | * | 1/2004 | Schulz et al. ................ | 439/607 |
| 6,705,879 B2 | * | 3/2004 | Engel et al. ................ | 439/76.1 |
| 6,729,905 B1 | * | 5/2004 | Hwang ........................ | 439/607 |
| 6,731,510 B1 | * | 5/2004 | Hwang et al. ............... | 361/754 |
| 6,746,158 B2 | * | 6/2004 | Merrick ........................ | 385/53 |
| 6,746,264 B1 | * | 6/2004 | Branch et al. ............... | 439/352 |
| 6,749,448 B2 | * | 6/2004 | Bright et al. ................ | 439/160 |
| 6,752,663 B2 | * | 6/2004 | Bright et al. ................ | 439/607 |
| 6,758,699 B1 | * | 7/2004 | Hwang et al. ............... | 439/676 |
| 6,762,940 B2 | * | 7/2004 | Zaremba ...................... | 361/728 |
| 6,778,399 B2 | * | 8/2004 | Medina et al. ............... | 361/729 |
| 6,780,053 B1 | * | 8/2004 | Yunker et al. ............... | 439/607 |
| 6,786,653 B1 | * | 9/2004 | Hwang et al. ................. | 385/92 |
| 6,789,958 B2 | * | 9/2004 | Ahrens et al. ................. | 385/92 |
| 6,805,573 B2 | * | 10/2004 | Phillips et al. .............. | 439/352 |

* cited by examiner

*Primary Examiner*—Ross Gushi

(57) ABSTRACT

A pluggable transceiver module for insertion into a cage includes a front shell and a housing. The housing includes a forward portion having electrical contacts and a rearward portion. The rearward portion is receivable in the cage. The rearward portion includes a tab that is receivable in a module latch on the cage for retention of the rearward portion within the cage. The rearward portion is configured to receive an electrical connection proximate an end thereof. The forward portion is received in the front shell and the forward portion includes a connector interface configured to receive a mating plug connector. An actuator is slidably coupled to the forward portion of the housing and is movable from a latched position to a released position. The actuator engages the module latch to release the housing from the cage when the actuator is moved to the released position. A bail member is rotatably coupled to the forward portion of the housing. The bail member engages the actuator to move the actuator between the latched position and the released position as the bail member is rotated between corresponding latched and released positions.

22 Claims, 8 Drawing Sheets

TRANSCEIVER PLUGGABLE MODULE

BACKGROUND OF THE INVENTION

The invention relates generally to connector receptacles for use in networking applications and, more particularly, to a pluggable copper transceiver module for use in such applications.

Transceiver modules are used for making bi-directional connections to communication devices such as modems, network interfaces, and other electronic modules or electrical systems such as computer systems and the like. Along with the general trend toward faster, higher performance electrical systems, particularly with regard to computer systems, there is an ongoing trend toward the development of higher density interconnect components.

It is well known that industry standards are often developed to standardize or define the type of connectors used to interface components such as transceivers with other communication devices. One such standard is the Small Form-Factor Pluggable (SFP) standard that includes specifications for transceivers that are reduced in size to achieve a higher port density over a prior well known standard, the Gigabit Interface Converter Module (GBIC). SFP supports both fiber optic transceivers and cable assemblies at data transfer rates above two gigabits per second (Gbs), and lower speed, shorter distance copper based data transfer. For applications capable of running at the lower speeds, a system operator may opt to continue to run at the lower speed and use their current infrastructure without re-cabling to reduce operating costs. Thus, there is an ongoing need for a copper based transceiver for mechanically and electrically interfacing shorter distance, slower speed legacy applications, such as those based on RJ45 cabling, with SFP compliant systems.

Typically, an SFP transceiver module is inserted into a complementary metal cage assembly that is mounted on a circuit board. In order to increase transceiver density on the circuit board, a stacked cage and connector system is sometimes used wherein the transceivers are arranged in rows and columns with each transceiver module plugged into a socket or receptacle in the cage. In at least some applications, the receptacles include a release mechanism to remove a transceiver module from the receptacle. In order to maintain the transceiver density on the circuit board, it is desirable that the release mechanism be no wider than the body of the transceiver module.

BRIEF DESCRIPTION OF THE INVENTION

In an exemplary embodiment of the invention, a pluggable transceiver module for insertion into a cage is provided. The module includes a front shell and a housing. The housing includes a forward portion having electrical contacts and a rearward portion. The rearward portion is receivable in the cage. The rearward portion includes a tab that is receivable in a module latch on the cage for retention of the rearward portion within the cage. The rearward portion is configured to receive an electrical connection proximate an end thereof. The forward portion is received in the front shell and the forward portion includes a connector interface configured to receive a mating plug connector. An actuator is slidably coupled to the forward portion of the housing and is movable from a latched position to a released position. The actuator engages the module latch to release the housing from the cage when the actuator is moved to the released position. A bail member is rotatably coupled to the forward portion of the housing. The bail member engages the actuator to move the actuator between the latched position and the released position as the bail member is rotated between corresponding latched and released positions.

Optionally, the housing includes an upper mold and a lower mold. The lower mold holds electrical contacts and a circuit board that includes performance circuitry for the transceiver. The transceiver also includes a lower cover that includes the actuator. The bail member is also rotatably coupled to the lower cover.

In an alternative embodiment of the invention, a pluggable transceiver module is provided that includes a cage having a module receiving end and an opposite electrical connection end and is configured for attachment to a circuit board, a front shell, and a housing. The housing includes a forward portion having electrical contacts and a rearward portion. The rearward portion is received in the cage through the module receiving end. The rearward portion includes a tab receivable in a module latch on the cage for retention of the rearward portion therein. The rearward portion is configured to receive an electrical connection through the cage electrical connection end. The forward portion is received in the front shell and is configured to receive a mating plug connector. The forward portion is larger than the module receiving end of the cage. An actuator is slidably coupled to the forward portion of the housing and is movable from a latched position to a released position. The actuator engages the module latch to release the housing from the cage when the actuator is moved to the released position. A bail member is rotatably coupled to the forward portion of the housing. The bail member engages the actuator to move the actuator between the latched position and the released position as the bail member is rotated between corresponding latched and released positions. The bail member has a width that is no greater than a width of the housing.

In another alternative embodiment of the invention, a pluggable transceiver module for insertion into a cage is provided that includes a front shell and a housing. The housing includes a forward portion holding electrical contacts and a rearward portion. The rearward portion is receivable in the cage. The rearward portion includes a tab receivable in a module latch on the cage for retention of the rearward portion within the cage. The rearward portion is configured to receive an electrical connection proximate an end thereof The forward portion is received in the front shell and the forward portion includes a connector interface configured to receive a mating plug connector. A lower cover is coupled to the housing. The lower cover includes an actuator having laterally extending wings engaging the lower cover for sliding contact therewith. The actuator is movable from a latched position to a released position. The actuator engages the module latch to release the housing from the cage when the actuator is moved to the released position. A bail member is rotatably coupled to the lower cover. The bail member engages the actuator to move the actuator between the latched position and the released position as the bail member is rotated between corresponding latched and released positions.

DETAILED DESCRIPTION OF THE INVENTION

Figure 1:
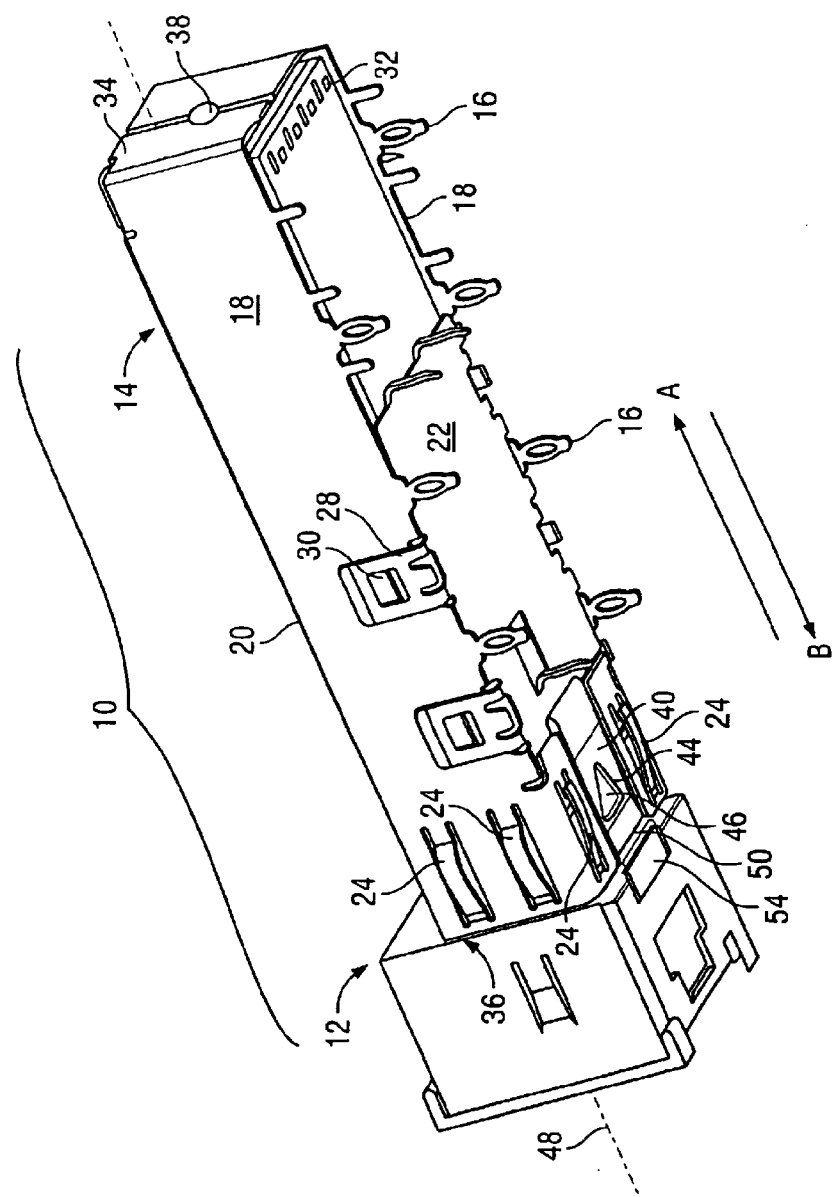
FIG. 1 is a perspective view of a transceiver assembly formed in accordance with an exemplary embodiment of the present invention.

FIG. 1 illustrates a perspective view of a transceiver assembly 10 formed in accordance with an exemplary embodiment of the present invention. The assembly 10 is adapted to interface a legacy-type system or device, sometimes referred to as a copper based system or device, operating at speeds of one gigabit per second (Gbs) or less, with a higher speed network or device operating at or above two Gbs. It is appreciated, however, that the benefits and advantages of the invention may accrue equally to other data transmission rates and across a variety of systems and standards. Therefore, while the invention is described and illustrated in the context of assembly 10, the invention is not intended to be limited to assembly 10, and assembly 10 is therefore provided for purposes of illustration rather than limitation.

As shown in FIG. 1, the assembly 10 includes a transceiver module 12 having a small form-factor pluggable (SFP) interface that is received in an SFP cage 14. The connector cage 14 includes contact pins 16 that are received in apertures in a circuit board (not shown) for attaching the cage 14 to the circuit board. The cage 14 is box-shaped having opposite and substantially parallel side walls 18, a top wall 20, and a bottom wall 22. The side walls 18, top wall 20 and bottom wall 22 each include spring tabs 24 that provide ground connections between the circuit board, the cage 14, and the transceiver 12. The bottom wall 22 also includes upturned latch elements 28 that receive latch projections 30 on the side walls 18 to join the bottom wall 22 to the side walls 18. Contact pads 32 are provided on the transceiver module 12 for making an electrical connection at a rearward end of the transceiver module 12. The cage 14 has an end wall 34 opposite an open end 36 through which the transceiver 12 is received. The end wall 34 includes an opening 38 through which a cable (not shown) can be received for making an electrical connection. In an alternative embodiment, the end wall 34 is at least partially opened for convenience in making electrical connections to the transceiver module 12.

The cage bottom wall 22 includes a spring latch 40 proximate the open end 36. The spring latch 40 includes a triangular-shaped opening 44 that receives a triangular-shaped tab 46 attached to the transceiver 12 to retain the transceiver 12 when the transceiver is inserted into the cage 14 along a longitudinal axis 48 in the direction of arrow A. The spring latch 40 has a lip 50 facing the opening 36 that is engaged by an actuator 54 on the transceiver 12 to release the transceiver 12 and allow the transceiver 12 to be withdrawn from the cage 14 in the direction of arrow B.

Figure 2:
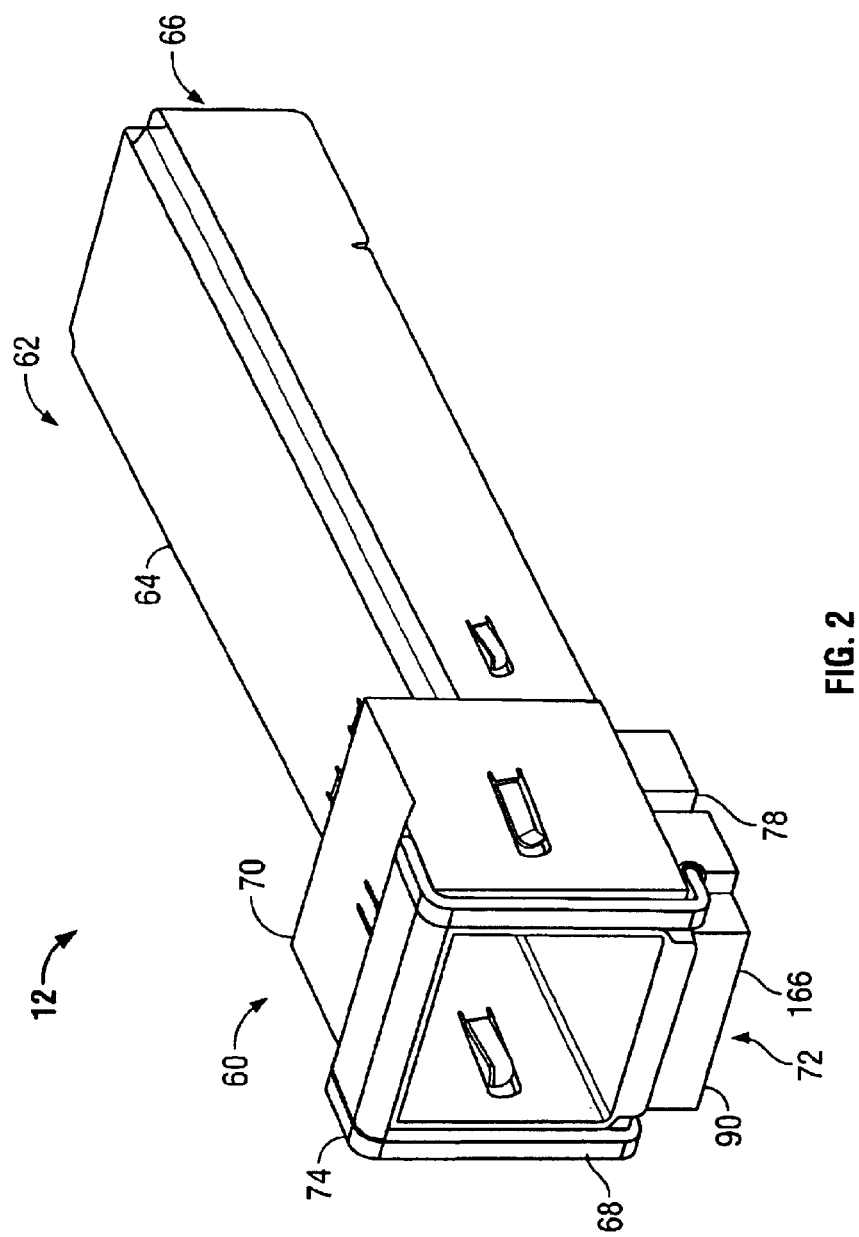
FIG. 2 is a perspective view of a transceiver module formed in accordance with an exemplary embodiment of the present invention.

FIG. 2 illustrates a perspective view of the transceiver module 12 removed from the cage 14 (shown in FIG. 1). The transceiver module 12 includes a forward portion 60 and a rearward portion 62. In an exemplary embodiment, the rearward portion 62 is SFP compliant and is sized to be received in the cage 14 (shown in FIG. 1). The rearward portion 62 includes a rear shell 64 and has a rearward end 66 that, in one embodiment, is adapted to receive a connection to a communications network or a communications device. The forward portion 60 includes a connector interface 68 that is configured to receive a mating plug connector (not shown). In an exemplary embodiment, the mating plug is an RJ45 plug connector. Thus, the transceiver 12 provides the capability for a user to run legacy applications using an existing infrastructure, such as RJ45, while interfacing with the SFP form factor.

The forward portion 60 of the transceiver 12 includes a front shell 70 and a lower cover assembly 72 that includes a bail member 74. The front shell 70 has a pair of clamping fingers 78 that engage the lower cover 72 to hold the lower cover 72 to the forward portion 60 of the transceiver 12. The bail member 74 is rotatably coupled to the lower cover 72. The front and rear shells 70 and 64 respectively encase a housing assembly 90. Electrical contacts 166 (shown more clearly in FIG. 3) are retained in the housing assembly 90.

Figure 3:
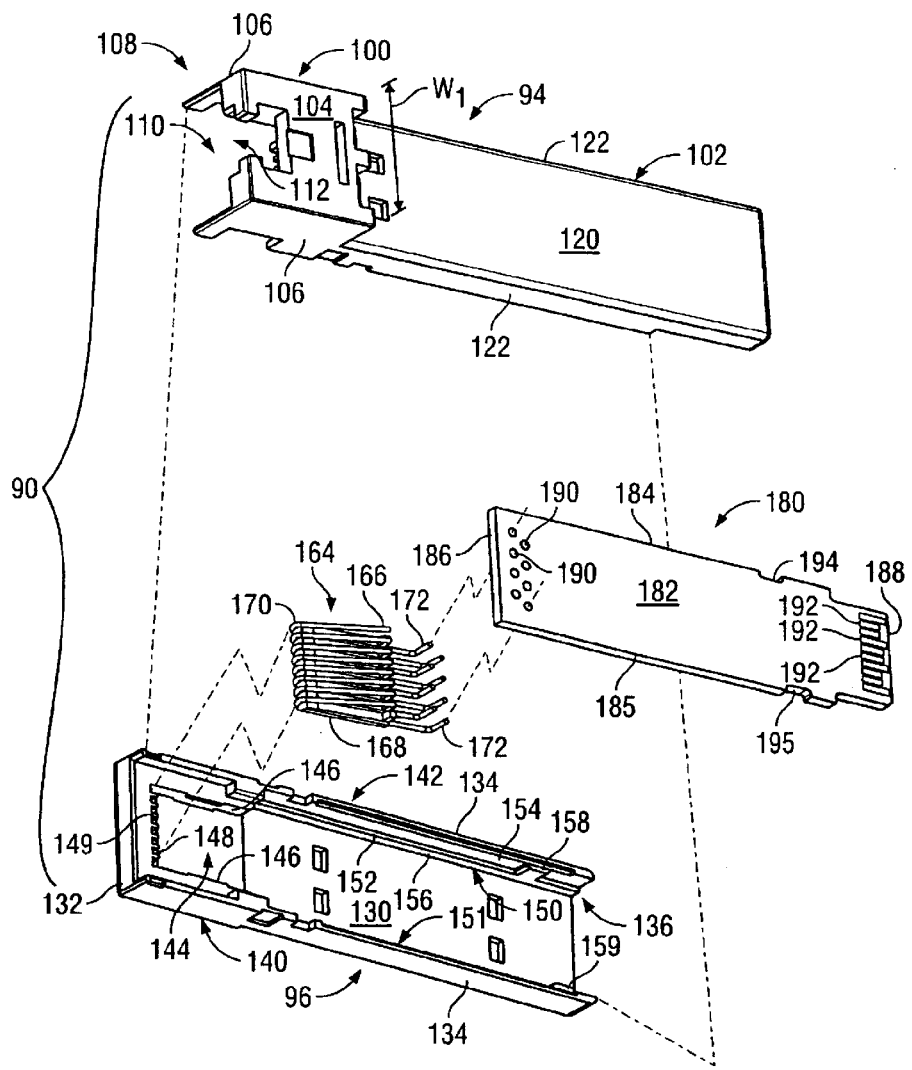
FIG. 3 is an exploded view of a housing assembly formed in accordance with an exemplary embodiment of the present invention.

FIG. 3 is an exploded view of the housing assembly 90. The housing assembly 90 includes an upper mold 94 and a lower mold 96. The upper and lower molds 94 and 96 are fabricated from a plastic or dielectric material. The upper mold 94 has a front portion 100 and a rear portion 102. The front portion 100 includes a top side 104 and opposed side panels 106. The front portion 100 includes a front face 108 that has an opening 110 that forms the opening of the connector interface 68 (FIG. 2) when the upper mold 94 is joined to the lower mold 96. The opening 110 includes a cutout 112 that is formed to receive a latch portion of a mating plug connector (not shown), which in one embodiment may be an RJ45 plug connector. The rear portion 102 of the upper mold 94 includes a top cover 120 and sides 122 that are coextensive with the side panels 106 of the front portion 100.

The lower mold 96 includes a bottom 130, a front wall 132, and a pair of side walls 134 that define an open rear end 136. The lower mold 96 has a front portion 140 and a rear portion 142. The front portion 140 includes a recess 144 defined by a pair of inner side walls 146 and a serrated inner front wall 148 that includes a plurality of teeth 149. The rear portion 142 includes inner side walls 150 and 151. Inner side wall 151 is configured similarly to inner side wall 150. Each inner side wall 150 and 151 defines a ledge 152 on each side between upper and lower vertical side surfaces 154 and 156 respectively. Inner side walls 150 and 151 include a tab 158 and 159 respectively. The tab 159 is positioned closer to the end 136 than tab 158.

The housing assembly 90 also includes an insert molded lead frame assembly 164. The lead frame assembly 164 includes a plurality of contact leads 166 that are overmolded with a plastic organizer 168. The organizer 168 holds the contact leads 166. The contact leads 166 are fabricated from a conductive material and are bent to form forward ends 170. Each contact lead 166 also has a rearward end 172. The lead frame assembly 164 is received in the recess 144 in the lower mold 96 with the contact lead forward ends 170 alternately positioned between the teeth 149 in the serrated inner front wall 148 with the rearward ends 172 of the contact leads 166 projecting upward.

The housing assembly 90 includes a circuit board 180 that has a body 182. The body 182 extends longitudinally between side edges 184 and 185 and includes a forward end 186 and a rearward end 188. A plurality of holes 190 are defined proximate the forward end 186 that are sized to receive the rearward contact ends 172 of the contact leads 166. The circuit board 180 also includes various electronic components (not shown) that make up the performance circuitry for the transceiver 12. The performance circuitry can be varied to tailor the transceiver 12 to meet the needs of a particular customer. In an exemplary embodiment, the circuitry includes ferrite beaded components that provide the magnetics required for electromagnetic interference (EMI) suppression.

A plurality of contact pads 192 are positioned proximate the rearward end 188 of the circuit board 180. The contact pads 192 provide a rearward electrical interface for the transceiver 12. Notches 194 and 195 are provided in side edges 184 and 185 respectively and are sized to receive the tabs 158 and 159 in the lower mold 96. The circuit board 180 is placed into the lower mold 96 so that the rearward ends 172 of the contact leads 166 are received in the holes 190 proximate the forward end 186. The circuit board 180 is further positioned so that the side edges 184 rest on the ledges 152 along the lower mold inner side walls 150 and 151. The tab 158 is received in the notch 194 while the tab 159 is received in the notch 195. Assembly of the housing 90 is completed by placing the upper mold 94 on to the lower mold 96 after the lead frame assembly 164 and circuit board 180 are loaded into the lower mold 96.

Figure 4:
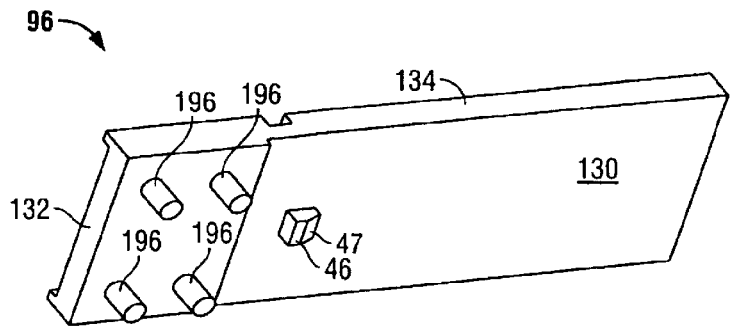
FIG. 4 is a perspective view of the underside of the lower mold of the housing shown in FIG. 3.

FIG. 4 illustrates a perspective view of the underside of the lower mold 96. A plurality of attachment posts 196 downwardly depend from the bottom wall 130 proximate the front wall 132. The attachment posts 196 are received in post holes 222 in the lower cover body 200 (see FIG. 5). The triangular tab 46 also depends from the underside of the bottom wall 130. The tab 46 is received in the triangular-shaped opening 44 on the spring latch 40 to latch the transceiver module 12 in the cage 14 (see FIG. 1). The tab 46 has a beveled surface 47 that facilitates insertion into the spring latch opening 44.

Figure 5:
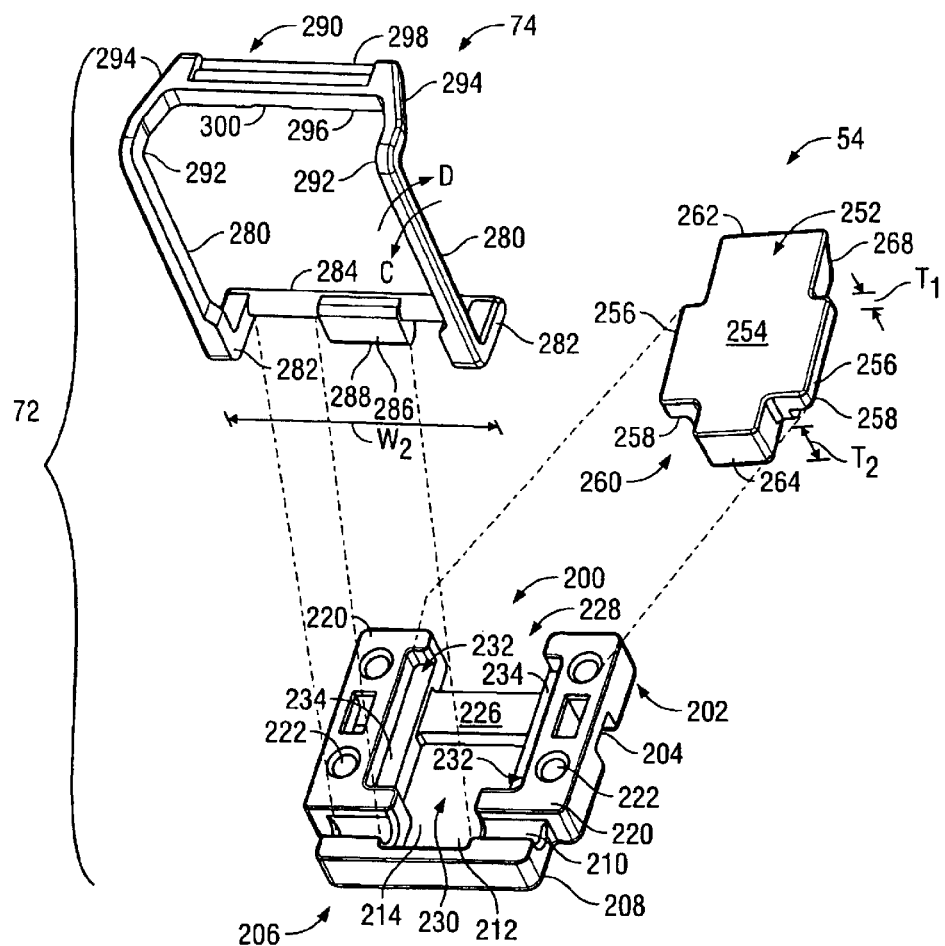
FIG. 5 is an exploded view of a lower cover assembly formed in accordance with an exemplary embodiment of the present invention.

FIG. 5 illustrates an exploded view of the lower cover assembly 72. The lower cover assembly 72 includes a main body 200 that has a pair of substantially parallel side rails 202. Each side rail 202 has an outwardly facing and centrally positioned notch 204. The body 200 has a forward end 206 that includes a bail cradle 208 that has a groove 210. The bail cradle 208 also has a centrally positioned cutout 212 that is an extension of a gap 214 between the side rails 202 at the body forward end 206. Each side rail 202 includes an upper surface 220 that includes post holes 222 that are sized to receive complementary posts 196 on the underside of the housing lower mold 96 (see FIG. 4). The body 200 also includes a cross member 226 proximate a rearward end 228. The bail cradle 208 and the cross member 226 cooperate to join and maintain the parallel relationship of the side rails 202. The body 200 includes a centrally located cavity 230 between the side rails 202 which each include an inwardly opening channel 232 that includes an upwardly facing ledge surface 234.

The lower cover assembly 72 also includes an actuator 54 that is movable to release the transceiver 12 from the cage 14. The actuator 54 includes a main body 252 that has a planar upper surface 254. A pair of opposed wings 256 laterally extend from the main body 254. The wings 256 are undercut with a lower surface 258 which gives the wings 256 a thickness $T_1$ that is less than a thickness $T_2$ of the main body 252. The actuator 54 has a forward facing end 260 and a rearward facing end 262. An actuation block 264 extends from the forward facing end 260. The rearward facing end 262 includes a beveled engagement surface 268 that engages the cage spring latch 40 (see FIG. 1) to release the transceiver module 12 from the cage 14. The actuator 54 is received in the central cavity 230 of the lower cover body 200. The undercut surface 258 of the wings 256 engage and rest upon the upward facing ledge surfaces 234 of the body 200 for sliding engagement of the actuator 54 with the lower cover body 200. The actuator 54 is slidable in the cavity 230 along the ledge surfaces 234 from a latched position proximate the forward end 206 of the body 200 to a released position proximate the rearward end 228 of the main body 200.

The bail member 74 is rotatably coupled to the lower cover body 200. The bail member 74 includes a pair of parallel side arms 280 that have a perpendicularly extending lower length 282 that give the side arms 280 an L-shape. The lower lengths 282 are joined by a pivot bar 284 that is received in the groove 210 of the bail cradle 208 and is rotatable in the groove 210 in the directions of arrows C and D. The pivot bar 284 includes a centrally positioned cam 286 that is received in the cutout 212 in the bail cradle 208. The cam 286 has an engagement edge 288 that engages the actuation block 264 of the actuator 54 when the bail member 74 is rotated in the direction of arrow C to move the actuator 54 to release the transceiver module 12 from the cage 14. The bail member 74 is rotated in the direction of arrow D to a latched position wherein the cam engagement edge 288 is removed from engagement with the actuator 54. The bail member 74 has an upper cross member 290 that is joined to the side arms 280 by bend sections 292. The cross member 290 includes a cross bar 296 and a finger bar 298. The cross bar 296 includes a centrally positioned depression 300. The finger bar 298 is provided for ease of operation of the bail member 74 by a user. The bail member is sized to have an overall width $W_2$ that is no wider than a maximum width $W_1$ (FIG. 3) of the transceiver housing 90. Placement of the bail member 74 into the groove 210 of the bail cradle 208 completes the assembly of the lower cover. In an exemplary embodiment, the lower cover main body 200 and the bail member 74 are fabricated from a die cast metal to enhance the suppression of electromagnetic interference (EMI).

Figure 6:
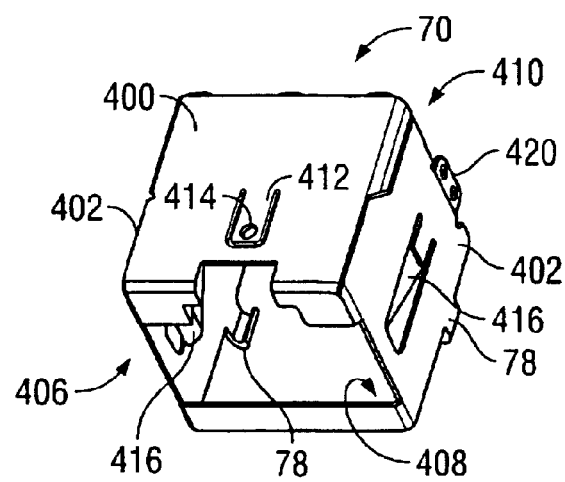
FIG. 6 is a perspective view of a front shell for a transceiver module.

FIG. 6 illustrates a perspective view of a front shell 70. The front shell 70 is a hollow box-shaped metal element that includes a top 400, a pair of opposed side panels 402, and a front face 406. The front shell 70 has an open bottom 408 and an open rear end 410. The top 400 includes a tab portion 412 that includes a latch button 414. The side panels 402 each includes a spring latch 416. The front shell 70 is slid over the front portion of the housing assembly 90 (shown in FIG. 3) until the inside of the front face 406 abuts the front face 108 of the upper mold 94 and the front wall 132 of the lower mold 96. Clamping fingers 78 extend downwardly from the side panels 402 and a shell tab 420 extends rearwardly from each side panel 402.

Figure 7:
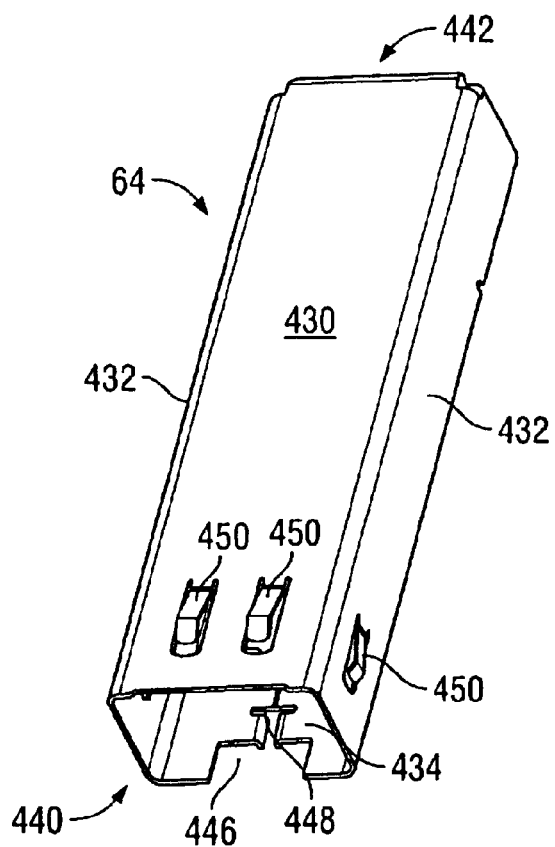
FIG. 7 is a perspective view of a rear shell for a transceiver module.

FIG. 7 illustrates a perspective view of a rear shell 64. As with the front shell 70, the rear shell is also a hollow box-shaped metal element. The rear shell includes a top 430 and opposed side panels 432. The side panels 432 wrap around to form a bottom 434. The rear shell has an open front end 440 and a rear end 442 that is sufficiently open to allow a connection to be made to the circuit board 180

(shown in FIG. 3) in the housing 90. The bottom 434 includes a cutout 446 and an opening 448. The rear shell 64 receives a rear portion of the housing assembly 90 that includes rearward portions 102 and 142 of the upper and lower molds 94 and 96 respectively. The cutout 446 in the bottom 434 provides clearance for the actuator rearward facing end 262 (shown in FIG. 5). The opening 448 receives the tab 46 on the underside of the lower mold 96. The rear shell 64 is installed after the front shell 70 and is slid over the shell tabs 420 on the front shell side panels 402. The rear shell also includes spring tabs 450 that provide ground connections when the transceiver module 12 is installed in the cage 14.

After the housing 90 is installed in the front and rear shells 70 and 64 respectively, the assembly of the transceiver module 12 is completed by joining the lower cover assembly 72 to the housing lower mold 96. The lower cover assembly 72 is joined to the lower mold 96 by first rotating the bail member 74 downwardly in the direction of the arrow C (see FIG. 5) then inserting the lower mold attachment posts 196 into the post holes 222 in the lower cover main body 200. Finally, the clamping fingers 78 that extend from the front shell side panels 402 are snapped into the notches 204 in the side rails of the lower cover main body 200. The bail member 74 is rotated toward the front shell 70 and snapped over the latch button 414 on the front shell 70 to complete the assembly of the transceiver module 12.

Figure 8:
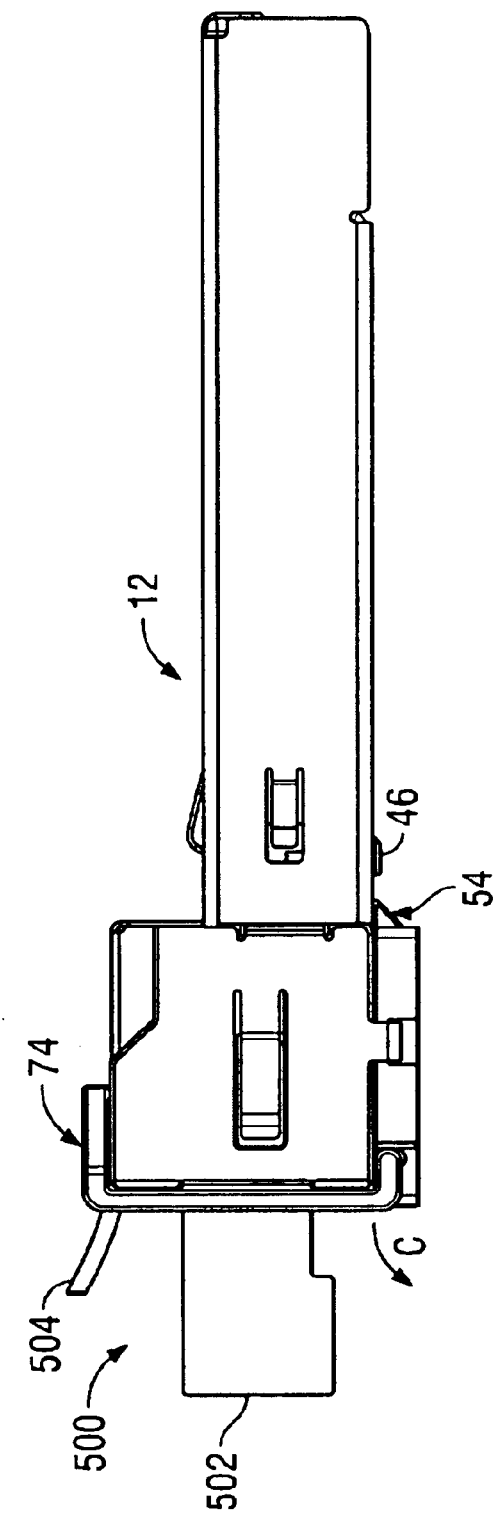
FIG. 8 is a side view illustrating a transceiver module formed in accordance with an exemplary embodiment of the present invention with a mating plug connector.

FIG. 8 illustrates a side view of an exemplary transceiver module 12 coupled to a plug 500. In an exemplary embodiment, the plug 500 is a known RJ45 plug. The plug 500 includes a main body 502 and an RJ45 release lever 504. As illustrated in FIG. 8, the bail member 74 cannot be lowered sufficiently, that is, rotated in the direction of the arrow C, to operate the transceiver actuator 54 while the plug 500 is installed due to interference with the plug release lever 504. This is a safety measure that requires that there be no plug at the interface, e.g. that there not be an electrical connection in place when the transceiver is added or removed from a cage, such as the cage 14 shown in FIG. 1.

Figure 9:
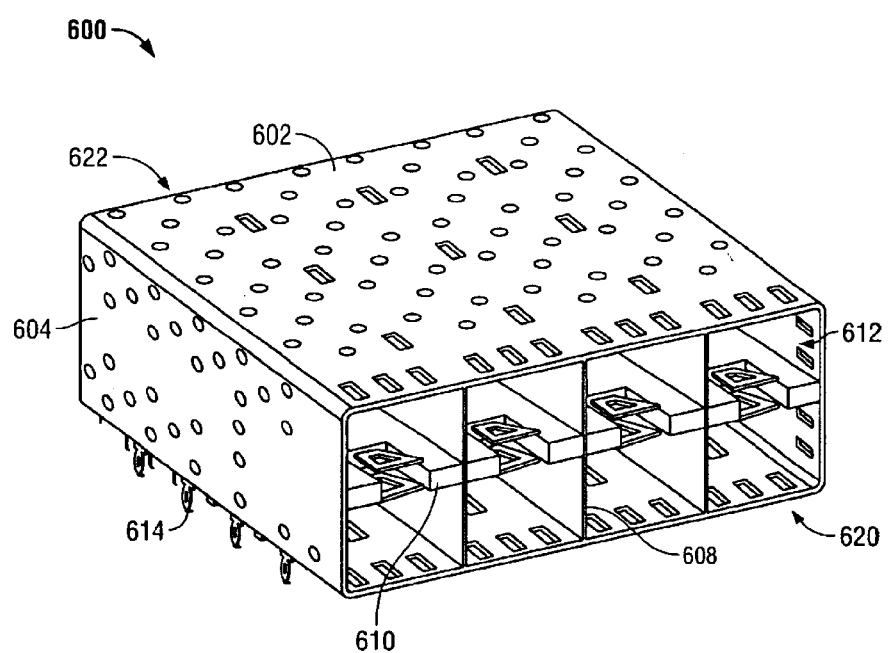
FIG. 9 is a perspective view of a stacked SFP cage system.

FIG. 9 illustrates a perspective view of an alternative stacked SFP cage system 600 with which the transceiver module 12 may be used. The stacked cage 600 includes a top cover 602 with side panels 604. The cage system 600 includes vertical and horizontal dividers 608 and 610 respectively that divide the cage system 600 into a total of eight transceiver compartments 612. The stacked cage 600 includes contact pins 614 that, in one embodiment, are configured for press fit installation on a circuit board (not shown). The cage system 600 has a forward module receiving face 620 and a rearward end 622 through electrical connections may be made. In one embodiment, the rearward end 622 is substantially open.

Figure 10:
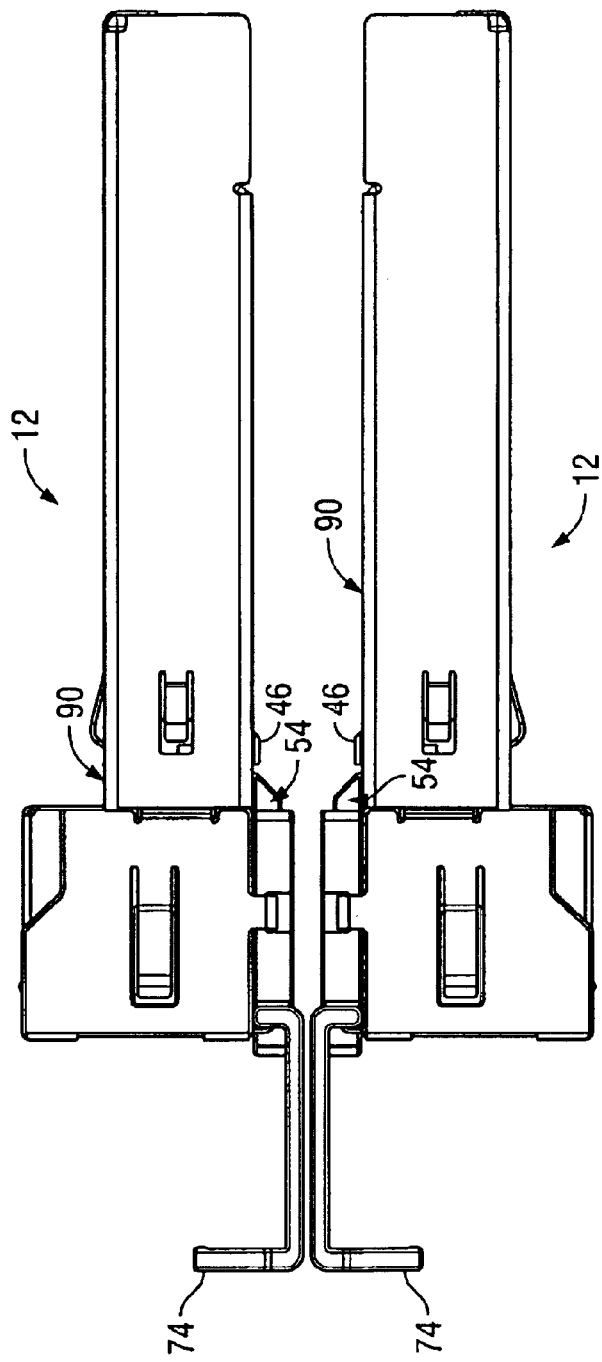
FIG. 10 is a side view illustrating a pair of transceiver modules oriented for use in the stacked SFP cage system shown in FIG. 9.

FIG. 10 illustrates a side view of a pair of transceiver modules 12 arranged in a belly-to-belly orientation for use with the stacked SFP cage system 600 shown in FIG. 9. Each transceiver module 12 is depicted with respective bail members actuated so that the transceiver module 12 can be removed from a cage system such as the system 600 (see FIG. 9). The arrangement of FIG. 10 places the respective bail members 74, along with respective actuators 54 and latch tabs 46 in close proximity with each other as is required by the stacked cage arrangement. This arrangement is permitted due to the relative width dimensions of the transceiver body 90 and the bail members 74 as described above (see FIGS. 3 and 4).

The embodiments thus described provide a pluggable transceiver module that can be used to interface shorter distance and slower speed systems, sometimes referred to as copper based, or RJ45 legacy type systems and infrastructure, while using the SFP form factor. The transceiver has a rearward end that is SFP compliant for making network or other electrical connections and front or forward interface that is RJ45 compliant. The transceiver is designed to be mounted in an SFP compliant cage and can be used in stacked cages for increased port density on a circuit board.

While the invention has been described in terms of various specific embodiments, those skilled in the art will recognize that the invention can be practiced with modification within the spirit and scope of the claims.

What is claimed is:

1. A pluggable transceiver module for insertion into a cage, said module comprising:

a front shell;

a housing comprising a forward portion including electrical contacts and a rearward portion, said rearward portion receivable in the cage, said rearward portion including a tab receivable in a module latch on the cage for retention of said rearward portion within the cage, said rearward portion configured to receive an electrical connection proximate an end thereof, said forward portion received in said front shell and said forward portion including a connector interface configured to receive a mating plug connector;

an actuator slidably coupled to said forward portion of said housing and movable from a latched position to a released position, said actuator engaging said module latch to release said housing from the cage when said actuator is moved to said released position; and a bail member rotatably coupled to said forward portion of said housing, said bail member engaging said actuator to move said actuator between said latched position and said released position as said bail member is rotated between corresponding latched and released positions.

2. The module of claim 1, wherein said housing includes an upper mold and a lower mold, said lower mold holding said electrical contacts.

3. The module of claim 1, wherein said housing includes an upper mold and a lower mold, said lower mold holding a circuit board, said circuit board including performance circuitry for said transceiver.

4. The module of claim 1, further comprising a lower cover coupled to said housing forward portion, said lower cover including a channel sized to receive said actuator for sliding engagement therewith.

5. The module of claim 1, further comprising a lower cover coupled to said housing forward portion, said bail member rotatably coupled to said lower cover.

6. The module of claim 1, wherein said housing includes an upper mold and a lower mold, and said module further comprises a lower cover, said lower cover including a pair of side rails, each said side rail defining at least one hole therein, said lower mold including at least one post on a lower side thereof sized to be received in said at least one hole.

7. The module of claim 1, further comprises a lower cover, said lower cover including a pair of side rails, said front shell including clamping fingers that snappably engage said side rails to join said lower cover to said housing front portion.

8. The module of claim 1, wherein said bail member includes a pivot bar and a cam centrally positioned on said pivot bar, said cam engaging said actuator to move said actuator between said latched position and said released position as said bail member is rotated between corresponding latched and released positions.

9. The module of claim 1, wherein said bail member includes a cross-member and said front shell includes a latch bump on an upper surface thereof, said latch bump engaging said cross-member to hold said bail member in a latched position.

10. The module of claim 1, wherein said interface is an RJ45 interface.

11. The module of claim 1 further comprising a rear shell, said rear shell configured to receive said rearward portion of said housing, said rear shell sized for insertion into the cage.

12. A pluggable transceiver module comprising:
- a cage having a module receiving end and an opposite electrical connection end, said cage configured for attachment to a circuit board;
- a front shell;
- a housing comprising a forward portion including electrical contacts and a rearward portion, said rearward portion received in said cage through said module receiving end, said rearward portion including a tab receivable in a module latch on said cage for retention of said rearward portion therein, said rearward portion configured to receive an electrical connection through said cage electrical connection end, said forward portion received in said front shell and configured to receive a mating plug connector, and wherein said forward portion is larger than said module receiving end of said cage;
- an actuator slidably coupled to said forward portion of said housing and movable from a latched position to a released position, said actuator engaging said module latch to release said housing from said cage when said actuator is moved to said released position; and
- a bail member rotatably coupled to said forward portion of said housing, said bail member engaging said actuator to move said actuator between said latched position and said released position as said bail member is rotated between corresponding latched and released positions, said bail member having a width that is no greater than a width of said housing.

13. The module of claim 12, wherein said housing includes an upper mold and a lower mold, said lower mold holding said electrical contacts.

14. The module of claim 12, wherein said housing includes an upper mold and a lower mold, said lower mold holding a circuit board, said circuit board including performance circuitry for said transceiver.

15. The module of claim 12, further comprising a lower cover coupled to said housing forward portion, said lower cover including a channel sized to receive said actuator for sliding engagement therewith.

16. The module of claim 12, further comprising a lower cover coupled to said housing forward portion, said bail member rotatably coupled to said lower cover.

17. The module of claim 12, wherein said housing includes an upper mold and a lower mold, and said module further comprises a lower cover, said lower cover including a pair of side rails, each said side rail defining at least one hole therein, said lower mold including at least one post on a lower side thereof sized to be received in said at least one hole.

18. The module of claim 12, further comprises a lower cover, said lower cover including a pair of side rails, said front shell including clamping fingers that snappably engage said side rails to join said lower cover to said housing front portion.

19. The module of claim 12, wherein said bail member includes a pivot bar and a cam centrally positioned on said pivot bar, said cam engaging said actuator to move said actuator between said latched position and said released position as said bail member is rotated between corresponding latched and released positions.

20. A pluggable transceiver module for insertion into a cage, said module comprising:
- a front shell;
- a housing comprising a forward portion holding electrical contacts and a rearward portion, said rearward portion receivable in the cage, said rearward portion including a tab receivable in a module latch on the cage for retention of said rearward portion within the cage, said rearward portion configured to receive an electrical connection proximate an end thereof, said forward portion received in said front shell and said forward portion including a connector interface configured to receive a mating plug connector;
- a lower cover coupled to said housing, said lower cover including an actuator having laterally extending wings engaging said lower cover for sliding contact therewith, said actuator movable from a latched position to a released position, said actuator engaging said module latch to release said housing from the cage when said actuator is moved to said released position; and
- a bail member rotatably coupled to said lower cover, said bail member engaging said actuator to move said actuator between said latched position and said released position as said bail member is rotated between corresponding latched and released positions.

21. The module of claim 20, wherein said housing includes an upper mold and a lower mold, said lower mold holding said electrical contacts and a circuit board, said circuit board including performance circuitry for said transceiver.

22. The module of claim 20 further comprising a rear shell, said rear shell configured to receive said rearward portion of said housing, said rear shell sized for insertion into the cage.

* * * * *